United States Patent
Lehmann et al.

[11] Patent Number: 6,161,286
[45] Date of Patent: Dec. 19, 2000

[54] PROCESS FOR MANUFACTURING A VEHICLE BODY SHELL

[75] Inventors: Bernhard Lehmann, Stuttgart; Michael Riestenpatt genannt Richter, Bondorf, both of Germany

[73] Assignee: DaimlerChrysler AG, Stuttgart, Germany

[21] Appl. No.: 09/104,000

[22] Filed: Jun. 24, 1998

[30] Foreign Application Priority Data

Jun. 24, 1997 [DE] Germany .......................... 197 26 723

[51] Int. Cl.$^7$ .................................................. B21D 53/88
[52] U.S. Cl. ........................... 29/897.2; 29/446; 296/194
[58] Field of Search ................................. 29/897.2, 464, 29/446; 296/194, 204

[56] References Cited

U.S. PATENT DOCUMENTS 4,440,435   4/1984   Norlin .
4,778,098   10/1988  Rimbaud .

FOREIGN PATENT DOCUMENTS

| 0 274 993 | 7/1988 | European Pat. Off. . |
| 37 18 841 | 12/1988 | Germany . |
| 40 08 895 | 10/1990 | Germany . |
| 195 10 763 A1 | 9/1996 | Germany . |
| 195 24 758 | 1/1997 | Germany . |

OTHER PUBLICATIONS

Japanese Abstract No. 63087379, vol. 012, No. 315, Aug. 26, 1998.

*Primary Examiner*—I Cuda Rosenbaum
*Assistant Examiner*—Trinh T. Nguyen
*Attorney, Agent, or Firm*—Evenson, McKeown, Edwards & Lenahan, P.L.L.C.

[57] ABSTRACT

In a process for manufacturing a vehicle body shell, the linking of an integral support to a forward structure of a known vehicle body shell may lead to tolerances which require readjustments of the axle geometry of the front axle. Accordingly, the bearing points of each wheel installation unit for the upper transverse control arm bearing which are situated behind one another in the longitudinal direction of the vehicle are brought to a defined distance range by a tensioning of the wheel installation unit, and a center fixation of the forward structure takes place relative to the longitudinal direction of the vehicle.

17 Claims, 1 Drawing Sheet

PROCESS FOR MANUFACTURING A VEHICLE BODY SHELL

BACKGROUND AND SUMMARY OF THE INVENTION

This application claims the priority of German Application No. 197 26 723.8, filed Jun. 24, 1997.

The invention relates to a process for manufacturing a vehicle body shell for a passenger car which has a forward structure provided with two side members and a forward cross member, an assembly cross member being joined to the side members, on which assembly cross member lower control arms of an axle are disposed, upper control arms being connected by way of two consoles with wheel installation units which are linked to the assigned side members.

In the case of Mercedes-Benz passenger cars, it is known to provide the forward structure of a body shell of a passenger car with an assembly cross member called an integral support which is linked from below to two side members of the forward structure. The assembly cross member, in particular, carries the engine, the steering system and the lower control arms of an axle whose upper control arms are disposed in the area of the wheel installation plates of the forward structure which are connected with the side members. Since the assembly cross member, as a separate component, after the completion of the forward structure, is joined from below to the side members during the overall assembling of the vehicle, tolerances occur on the suspension elements and damping elements as well as, in particular, between the upper and the lower bearing points for the control arms of the axle. This subsequently requires a high-expenditure adjustment of the wheel position angle on the axle.

It is an object of the invention to provide a manufacturing process of the above-mentioned type which considerably reduces the expenditures for finishing operations.

This object is achieved in that the bearing points of each wheel installation unit, which are situated behind one another in the longitudinal direction of the vehicle, for the upper control arm bearing, by means of a tensioning of the wheel installation unit, are brought to a defined distance range with respect to a central fixing in the transverse direction of the vehicle. A position of the side members which is identical with respect to the longitudinal direction of the vehicle with the fixing holes in the forward structure, which are punched in the component part, is established by a fastening on the fastening surfaces.

By means of the above-solution according to the present invention, it is possible to link the assembly cross member largely without tolerances, whereby later finishing operations for the adjustment of the various axle geometries are avoided. The solution according to the invention therefore provides a precisely symmetrical arrangement of the front axle by the appropriate selection of defined reference points. During the attaching of the wheel installation units with the side members to the shell body, these are fastened at a central fixation of the forward structure relative to the longitudinal and transverse direction of the vehicle at a fixed distance in parallel thereto in the transverse direction of the vehicle and at a positioning notch in the longitudinal direction of the vehicle. By means of the solution according to the invention, it is therefore possible to eliminate a first or basic adjustment of the axle geometry in a reliable manner with respect to the manufacturing process, whereby finishing operations are avoided.

According to the invention, the wheel installation units are therefore aligned on the left and on the right on the side member in parallel to the longitudinal direction of the vehicle relative to the positioning frame. In the transverse direction of the vehicle, the side members are fixed in parallel at a very precise distance with the aid of the connection points placed in the pressed part by means of fixing aids. The forward structure is then welded together. For placing the fastening bores for the upper transverse control arms for the position in the transverse direction of the vehicle relative to the lower axle pivot points, with respect to the described fixing system in the side member, the vehicle transverse direction position is measured and, relative thereto, the fastening holes for the upper transverse control arms are placed at a fixed distance.

As a further development of the invention, the forward structure is aligned and welded with respect to the body shell on a positioning frame axially symmetrical to a longitudinal center line. This provides the prerequisites for achieving a symmetrical arrangement of the assembly cross member and of the various bearing points of the front axle.

In a further development of the invention, the assembly cross member is aligned and positioned with the lower linking points of the axle relative to the consoles on the wheel installation unit for the fastening of the upper transverse control arms of an axle. In this case, fixing points on the side members are utilized in the longitudinal direction of the vehicle and one of these fixing points is utilized in the transverse direction of the vehicle for the positioning of the assembly cross member in the vehicle relative to the consoles of the upper control arm of an axle. On the assembly cross member, fixing aids are also installed relative to the lower linking points of the axle which fit into the fixing points on the side member structure of the body. This considerably reduces tolerances with respect to the linking of the assembly cross member to the body.

Other objects, advantages and novel features of the present invention will become apparent from the following detailed description of the invention when considered in conjunction with the accompanying drawings.

DETAILED DESCRIPTION OF THE DRAWINGS

Figure 1:
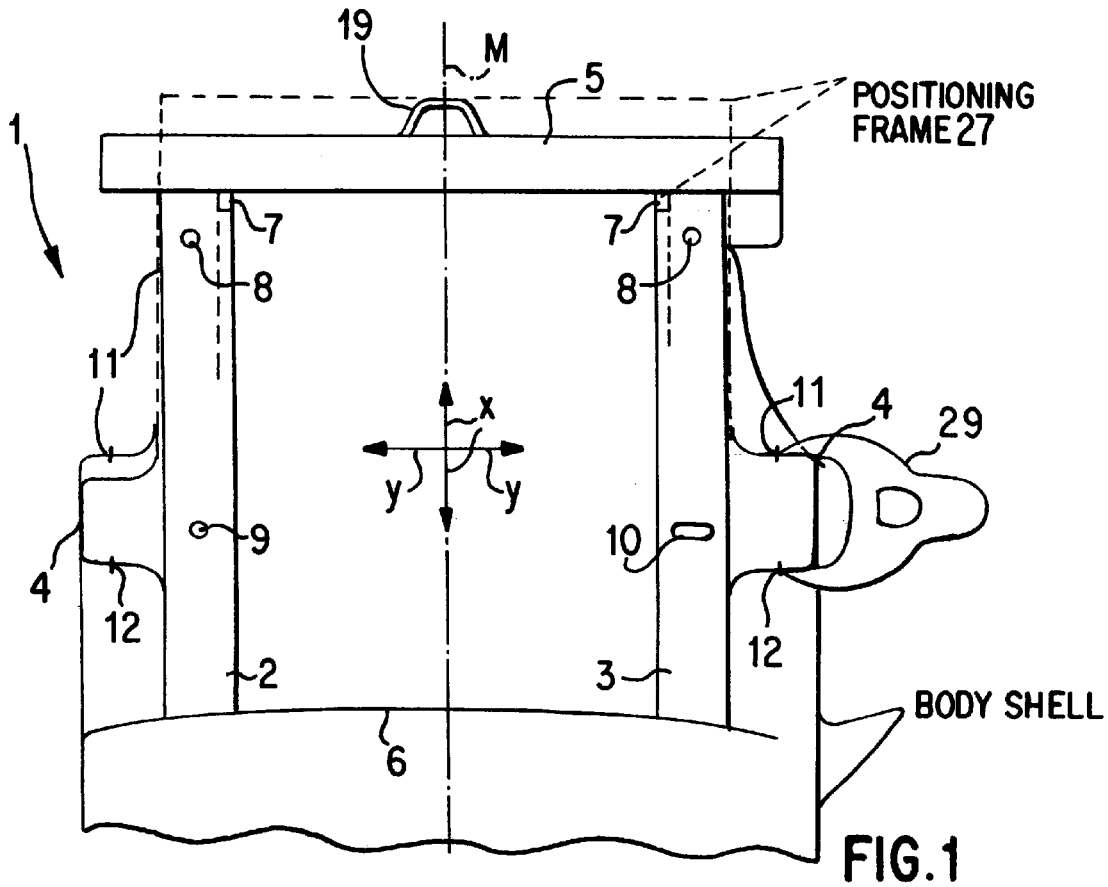
FIG. 1 is a schematic top view of a forward structure of a body shell of a passenger car prepared for the process according to the present invention.

A forward structure 1 for a passenger car has two side members 2, 3 which are connected on their forward front ends with one another by means of a forward cross member 5. On the back side, the side members 2, 3 are connected to a front wall 6 of the body shell 25. A wheel installation unit 4 is connected with each side member 2, 3 and in each case has receiving domes (not shown in detail) for spring struts, shock absorbers and other operating elements as well as bearing points 11, 12 for upper control arms 29 of an axle. According to FIG. 2, the lower control arms 18 of the axle are held on an assembly cross member which is called an integral support 13 and which, in addition, supports a drive assembly for the passenger car, a steering system as well as other operating elements. The integral support 13 is linked from below in a manner described in detail in the following via screwed connections or other types of connection elements to the side members 2, 3.

For producing the forward structure 1, the side members 2, 3 are first connected with the pertaining wheel installation units 4, as chassis aggregates. For this purpose, the side members 2, 3 each have fastening element 7 by which they are fixed in the longitudinal direction of the vehicle X to a corresponding part of the positioning station. Simultaneously, by means of their interior sides, the side members 2, 3 strike in the transverse direction Y of the vehicle against corresponding fastening surfaces of the positioning station. In the area of the fastening bores or fastening points, each wheel installation unit 4 is fixed at the level of the bearing points 11, 12 in the longitudinal direction X of the vehicle. After the fastening of the console for the spring struts, the shock absorbers, the upper control arms and optionally other operating elements and the pertaining side member 2, 3, each wheel installation unit 4 is connected with the pertaining side member 2, 3 by a suitable connection process, such as point welding, in particular.

These chassis aggregates are fixed in a positioning frame 27 in a forward area by means of fastening elements 7 in the longitudinal direction X of the vehicle and in the transverse direction Y of the vehicle on the interior surfaces of the side members as well as in their back-side area on corresponding flanges of a floor aggregate of the body shell. Subsequently, the chassis aggregate is welded on its front side to the forward cross member 5 and is welded on its back side to the front wall 6 as well as to the floor aggregate (which is not shown).

Figure 2:
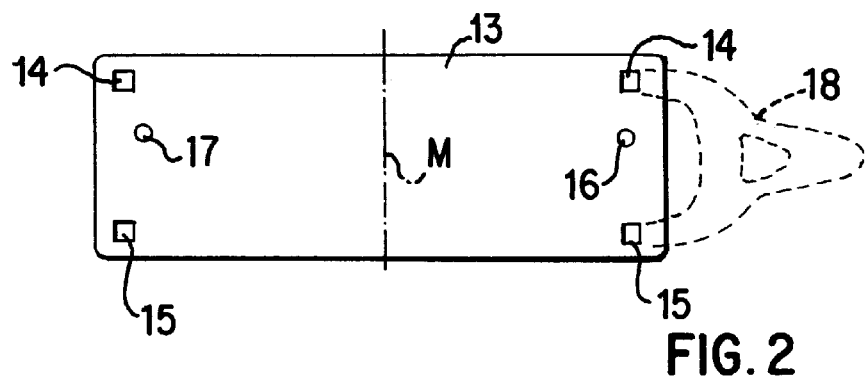
FIG. 2 is a schematic view of an assembly cross member which is provided for linking the side members of the forward structure according to FIG. 1.
Figure 3:
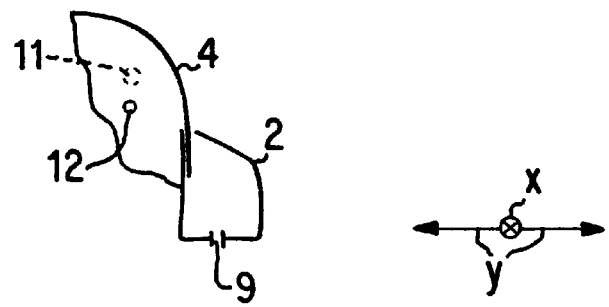
FIG. 3 is a schematic sectional view of a forward structure area on the left in the representation of FIG. 1 at the level of a wheel installation unit.

For a supplementary explanation of the solution according to the present invention, which will be demonstrated again in the following, the operation of the state of the art will be described first, an orientation taking place by means of the reference numbers of FIGS. 1 to 3. For linking the integral support 13, the forward structure 1 is aligned by means of a form-locking central fixing 19 exactly symmetrical with respect to a longitudinal center line M of the positioning frame serving as the positioning station. This longitudinal center line M will then be used as a reference axis for the positioning of a fixing hole 9 on an underside of the left side member 2 so that, in the transverse direction Y of the vehicle, the fixing hole 9 has a defined distance to the longitudinal center line M. In the longitudinal direction of the vehicle X, a defined distance of the fixing hole 9 is created in that, as reference points, defined bearing points 12 are selected for an upper transverse control arm console and in this alignment, the fixing hole is made, particularly drilled. The exact symmetrical arrangement of the bearing points 11, 12 is achieved already during the manufacturing of the chassis aggregate in that the wheel installation units are tensioned in the longitudinal direction X of the vehicle to a defined distance range during the welding. Thus, the geometrical center is defined between the bearing point 11 and the bearing point 12 so that, in the case of the opposite wheel installation units, no deviation of the distance ranges can occur between the bearing points 11 and 12. In the right side member 3, an oblong fixing hole 10 was punched into component parts. The oblong hole extends in the transverse direction Y. In order to now punch in the area of the bearing points 11, 12 the receiving device for the consoles of the upper cross member, a fixed fastening surface is used in the transverse direction Y of the vehicle on the positioning frame of the body. For this purpose, the bearing points 11, 12 are placed in both sides in a fixed assignment with respect to the measurements.

It is now the object of the present solution according to the invention to utilize the fixing hole 9 made in the component part in a side member 2 for the fixing in the transverse direction Y of the vehicle for the subsequent placing of the upper bearing points 11 and 12. The placing can take place by punching, drilling, lasering or other operating steps. The fixing hole 9 is also used as a reference coordinate in the transverse direction Y for the punching of the receiving device of the opposite bearing points 11, 12 of the right side member 3. The receiving devices 14 and 15 for the consoles of the lower transverse control arm 18 already exist on the integral support 13. The form-locking fixing pins 16 and 17 of the integral support 13, which correspond with the fixing points 9 and 10 of the side members 2, 3, will now be positioned on the integral support 13 as follows. The center between the opposite receiving devices of the lower transverse control arms 18 is defined in the longitudinal direction as a center line M. The distance of the left fixing pin 17 from this geometrical center line selected as a reference coordinate can now be defined and corresponds to the distance approximately to the transverse direction Y of the fixing hole 9 to the center line M on the body. The coordinate for the fixing pin 17 and the fixing pin 16 in the longitudinal direction X of the vehicle is defined in that the receiving devices 15 are used as the reference point. The positioning of the fixing pin 16 in the transverse direction Y of the vehicle may have tolerances since the assigned fixing point on the side member 3 is the oblong hole 10. Subsequently, the necessary measures can be taken in order to screw or fasten by another method the integral support 13, which by means of the fixing points, is already aligned precisely with the forward structure 1, on the side member 2, 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for manufacturing a vehicle body shell for a passenger car which has a forward structure provided with two side members and a forward cross member, an assembly cross member being joined to the two side members, lower control arms of an axle being disposed on said assembly cross member, upper control arms of an axle being connected by way of two consoles with wheel installation units which are linked to respective assigned ones of the two side members, the process comprising the steps of:

providing bearing points for each wheel installation unit for a bearing of the upper control arms of an axle, which bearing points are aligned with one another in a longitudinal direction of the vehicle, and by means of tensioning each of the wheel installation units, bringing said bearing points to a defined distance range with respect to a central fixing point in a transverse direction of the vehicle; and providing fixing holes in the two side members of the forward structure to establish a position of the two side members, which is identical with respect to a longitudinal axis of the vehicle.

2. Process according to claim 1, further comprising the step of fastening the two side members on the shell body with fastening elements, which are placed in the two side members, in the longitudinal direction of the vehicle and in parallel to the longitudinal axis.

3. Process according to claim 1, further comprising the steps of:
- aligning the forward structure on a positioning frame axially symmetrically with respect to the longitudinal axis; and
- connecting the forward structure with the shell body.

4. Process according to claim 2, further comprising the steps of:
- aligning the forward structure on a positioning frame axially symmetrically with respect to the longitudinal axis of the shell body; and
- connecting the forward structure with the shell body.

5. Process according to claim 1, further comprising the steps of:
- providing fastening points as a reference point for selecting the fixing holes on the two side members for positioning of the assembly cross member in the longitudinal direction of the vehicle; and
- positioning the assembly cross member on the two side members in a perpendicular manner with respect to the longitudinal direction of the vehicle.

6. Process according to claim 2, further comprising the steps of:
- providing fastening points as a reference point for selecting the fixing holes on the two side members for positioning of the assembly cross member in the longitudinal direction of the vehicle; and
- positioning the assembly cross member on the two side members in a perpendicular manner with respect to the longitudinal direction of the vehicle.

7. Process according to claim 3, further comprising the steps of:
- providing fastening points as a reference point for selecting the fixing holes on the two side members for positioning of the assembly cross member in the longitudinal direction of the vehicle; and
- positioning the assembly cross member on the two side members in a perpendicular manner with respect to the longitudinal direction of the vehicle.

8. Process according to claim 5, wherein the fixing hole in the transverse direction of the vehicle is selected as the reference point for positioning the receiving points on the two side members for fixing the assembly cross member.

9. Process according to claim 6, wherein the fixing hole in the transverse direction of the vehicle is selected as the reference point for positioning the receiving points on the two side members for fixing the assembly cross member.

10. Process according to claim 7, wherein the fixing hole in the transverse direction of the vehicle is selected as the reference point for positioning the receiving points on the two side members for fixing the assembly cross member.

11. Process according to claim 1, wherein said assembly cross member has a left and a right fixing point, and wherein said bearing points receive the upper control arms of an axle in the wheel installation units on said two side members of the vehicle body and are brought into a fixed range to a left fixing point symmetrically to the longitudinal axis of the vehicle.

12. Process according to claim 2, wherein said assembly cross member has a left and a right fixing point, and wherein said bearing points receive the upper control arms of an axle in the wheel installation units on said two side members of the vehicle body and are brought into a fixed range to a left fixing point symmetrically to the longitudinal axis of the vehicle.

13. Process according to claim 3, wherein said assembly cross member has a left and a right fixing point, and wherein said bearing points receive the upper control arms of an axle in the wheel installation units on said two side members of the vehicle body and are brought into a fixed range to a left fixing point symmetrically to the longitudinal axis of the vehicle.

14. Process according to claim 5, wherein said assembly cross member has a left and a right fixing point, and wherein said bearing points receive the upper control arms of an axle in the wheel installation units on said two side members of the vehicle body and are brought into a fixed range to a left fixing point symmetrically to the longitudinal axis of the vehicle.

15. Process according to claim 8, wherein said assembly cross member has a left and a right fixing point, and wherein said bearing points receive the upper control arms of an axle in the wheel installation units on said two side members of the vehicle body and are brought into a fixed range to a left fixing point symmetrically to the longitudinal axis of the vehicle.

16. A process for manufacturing a vehicle body shell for a passenger car, the process comprising the steps of:
- providing a forward structure having two side members, a forward cross member, an assembly cross member, lower control arms of an axle, and upper control arms of said axle;
- joining the assembly cross member to the two side members, on which the lower control arms of an axle are disposed;
- connecting the upper control arms of the axle to the wheel installation units which are linked to respective assigned ones of the two side members;
- providing bearing points for each wheel installation unit for a bearing of the upper control arms of an axle, which bearing points are aligned with one another in a longitudinal direction of the vehicle, and by means of tensioning each of the wheel installation unit, bringing said bearing points to a defined distance range with respect to a central fixing point in a transverse direction of the vehicle; and
- providing fixing holes in the two side members of the forward structure to establish a position of the two side members, which is identical with respect to a longitudinal axis of the vehicle.

17. The process according to claim 16, wherein the fixing holes are formed by punching the fixing holes in the two side members, and wherein the establishing of the position is carried out by fastening the two side members.

* * * * *